US005829200A

United States Patent [19]

Jones et al.

[11] Patent Number: 5,829,200

[45] Date of Patent: Nov. 3, 1998

[54] FIRE PROTECTION APPARATUS FOR A BUILDING STRUCTURE

[76] Inventors: Don N. Jones; Mary Carol Smith, both of P.O. Box 21751, Eugene, Oreg. 97402

[21] Appl. No.: 865,732

[22] Filed: May 30, 1997

[51] Int. Cl.[6] .................................................. B62D 63/04

[52] U.S. Cl. ................................................... 52/3; 52/5

[58] Field of Search ......................... 52/3, 4, 5, DIG. 12, 52/DIG. 14; 169/45, 48

[56] References Cited

U.S. PATENT DOCUMENTS 5,608,992 3/1997 Floyd ........................................ 52/3

*Primary Examiner*—Creighton Smith
*Attorney, Agent, or Firm*—James D. Givnan, Jr.

[57] ABSTRACT

The apparatus includes fire retardant blankets normally stowed within housings in place on a building roof structure or below a roof eave. Cables extract the blankets for deployment over a roof. Fire retardant wall blankets stowed in housings adjacent roof eaves are deployed by gravity. For protection of a building end wall having a gable,a blanket support is carried subjacent the end of a roof structure and, upon release , of the support the same pivots to the horizontal whereat a fire retardant blanket is deployed. Associated with the blanket support is a triangularly shaped gable blanket which deploys adjacent the gable. A modification of the apparatus includes a deck mounted blanket housing in which is stowed a fire retardant blanket drawn over the deck and downwardly by a winch and cables. A further modification includes a blanket housing atop a roof ridge with roof mounted cable and blanket supports. A winch retrieves cables attached to a combination roof and wall blanket to draw same into place and over cable and blanket supports and downwardly past a deck. Solenoid actuated guide pins permit the course of each cable to be altered during blanket deployment.

15 Claims, 3 Drawing Sheets

1
2
3
4
4A
5
6
9
11
20
34
39
50
51
52
53
54
55
56
57
58
60
61
62
63
64
66
66A
67
68
70
71
72
73
74
75
76
77
78
80
81
82
83
85
86
87
88
89
90
91
92
93
94
95
96
97
98
99
100

FIRE PROTECTION APPARATUS FOR A BUILDING STRUCTURE

BACKGROUND OF THE INVENTION

The present invention pertains generally to the positioning of a fire retardant blanket or blankets on and about a building structure in advance of a fire risk.

Many homes are lost each year within the United States from external fire causes. Homes lost are often those in high risk environments where adjacent homes are at risk from wildfires and all cannot be protected by available fire fighting services. Typically home losses from external fires occur in those areas at the interface of undeveloped land and urban areas where hilly terrain complicates fire protection as was the case in several recent fire losses in the southwestern part of the United States. Existing fire fighting capabilities in the above noted type of area are apparently inadequate as evidenced by the substantial replacement cost of residential properties each year.

Efforts have been made to impose stricter criteria for residential building materials to mitigate fire losses, however, such requirements are of little or no effect on existing homes. Further, changes in building materials may not protect a home or other building structure from severe temperatures which of themselves may cause substantial damage to a structure.

A particularly difficult obstacle occurs in protecting building and home structures in those areas where wildfires, propelled by high winds, advance across terrain at a rapid rate leaving very limited time for a home owner to take any measures to lessen potential losses. Further, as access to such home structures is often via narrow residential streets, home owners cannot rely on adequate man hour effort and in some instances have had to fend for themselves in the protection of a home.

The prior art known to the present inventor includes U.S. Pat. No. 3,715,843 which discloses a fire protection apparatus including fire retardant blankets and panels applied to and secured about a building by straps and ground inserted hold-down members requiring substantial time consuming manual installation effort.

U.S. Pat. No. 3,877,525 discloses roller mounted screens, each fitted with a weight, to extend the screen by gravity with provision made for applying a fire retardant to the screen during extension. The system is for internal installation within a building and does not appear to readily lend itself to protection of a building exterior.

U.S. Pat. No. 5,423,150 discloses an automatically deployed fire resistant blanket by use of projectiles propelling blanket extremities. No provision is made for firmly securing the blanket about the building structure being protected in a snug manner nor would the system appear to be feasable in the presence of strong winds which often are present in fast moving wildfires.

U.S. Pat. No. 4,858,395 discloses fire resistant sheets stored as rolls within roof mounted housings. The rolled sheet material is extracted by manually pulled ropes with certain sheets having a folded portion intended for, when unfolded, overlying the end wall of a house. The ground contacting edges of certain sheets may be provided with a bar to enhance ground engagement. The problem of manually extracting fire resistant sheets in the presence of an advancing brush fire, often accompanied by high winds, would seem to hinder use of the patented fire protection system.

SUMMARY OF THE PRESENT INVENTION

The present invention is directed toward the mechanical deployment of fire retardant blankets to a building structure in a rapid manner utilizing both powered and gravity actuated means to isolate the structure from an advancing fire.

In general, the present apparatus for blanket deployment utilizes a housing or housings in place along a roof ridge or roof eave with the roof fire blankets drawn into place by motor driven components. Fire retardant blankets protecting building walls may be deployed in a like manner or deployed by gravity. In a modified form of the present apparatus a blanket is deployed over a roof surface and is drawn past a roof eave down to a ground surface to jointly protect a roof and wall of a building or home structure. Provision is made for protecting the end walls and gables of a house which presents a problem in that such walls include triangular gable areas located immediately below a ridged roof structure. Fire protection for building end walls is afforded by a housing stowed in an inclined position subjacent a roof extremity and when released moves to the horizontal for discharge of a fire blanket adjacent the end wall. The triangular gable area above the end wall is protected by a blanket attached to and deployed by the weight of said housing.

Provision is made for the extension of a fire blanket over a raised deck of a house which embodiment, in one form, includes guide rails protruding from a roof edge. Such rails support cable runs during blanket extension with the blanket ultimately enclosing the deck and deck supports as well as the adjacent side wall of the house.

The present invention may utilize blanket housings which additionally constitute rain gutters positioned along roof eaves. A further embodiment of the present invention includes a fire retardang blanket rolled in a doubled manner and when extracted from its housing serves to overlie both roof areas of a ridged roof.

Important objectives of the present fire protection apparatus include the provision of what may be termed fire blankets stowed within housings in place on the structure being protected with depoloyment of the blankets being jointly by motorized components and by gravity; the provision of the foregoing objective achieved by the present apparatus with additional blanket deployment by gravity to protect upright exterior wall surfaces of the structure; the provision of such an apparatus wherein blanket housings are eave mounted and include gutters; the provision of a fire protection apparatus providing protection for the end or sidewall,with gable, of a house with provision for positioning fire blanket support adjacent the gable or triangular area of such a wall; the provision of a fire protection apparatus which may be activated automatically, or by the homeowner, to activate electrical components to avoid reliance on physical efforts by the homeowner or fire fighting personnel; the provision of a fire protection apparatus which affects aesthetic values of a house to a minimal extent by utilizing certain concealed components.

DETAILED DESCRIPTION OF THE PREFERRED EMBODIMENTS

Figures 1, 2, 3, 4, 5, 6, 7:
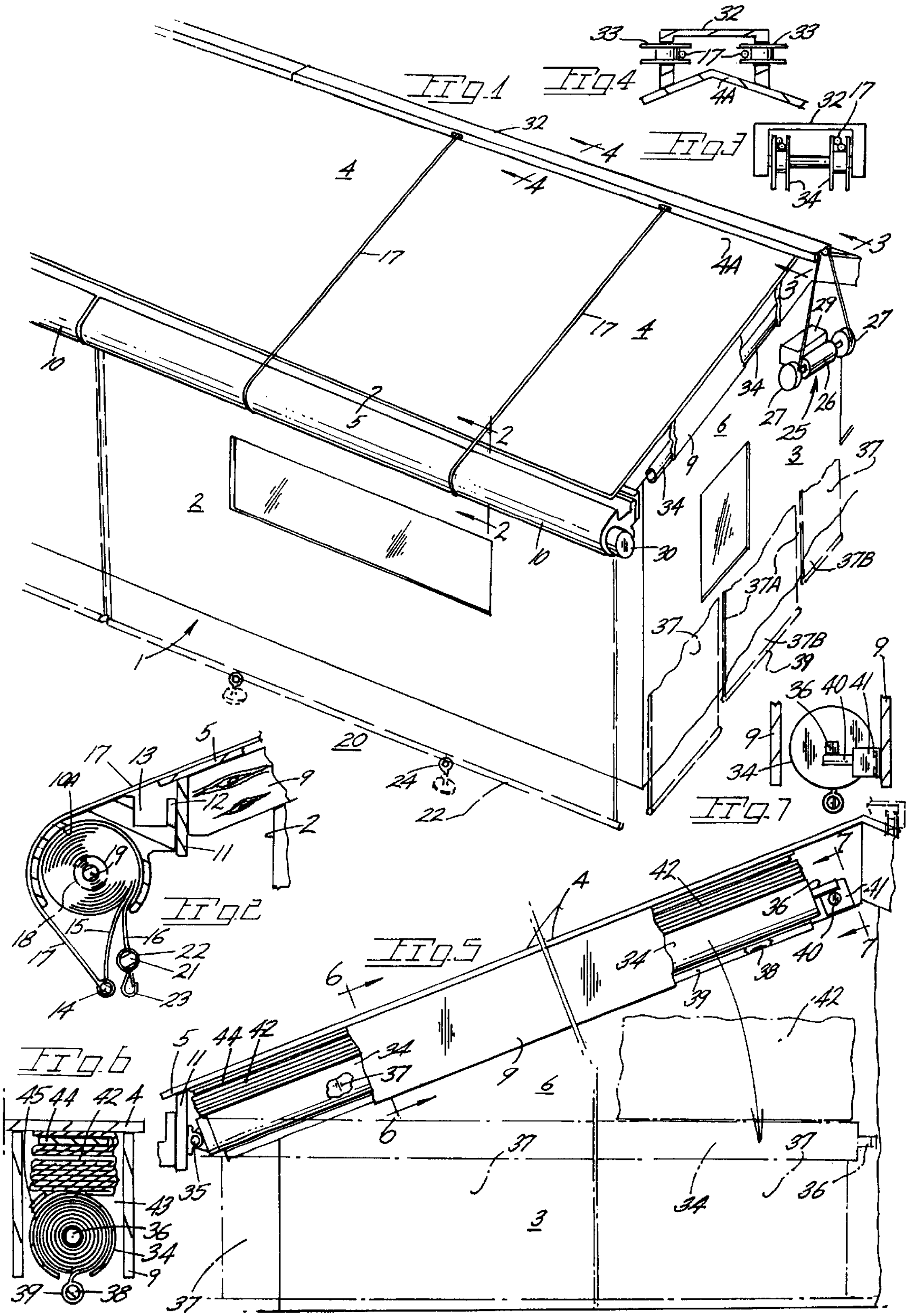
FIG. 1 is a perspective fragmentary view of a house provided with one embodiment of the present fire protection apparatus.
FIG. 2 is a vertical perspective view taken along line 2—2 of FIG. 1.
FIG. 3 is a vertical sectional view taken along line 3—3 of FIG. 1.
FIG. 4 is a vertical sectional view taken along line 4—4 of FIG. 1.
FIG. 5 is an end elevational view of FIG. 1 with a fire retardant blanket support stowed subjacent a roof and shown deployed in broken lines.
FIG. 6 is a vertical sectional view taken along line 6—6 of FIG. 5.
FIG. 7 is a vertical sectional view taken along line 7—7 of FIG. 5.

With continuing attention to the drawings wherein applied reference numerals indicate parts similarly hereinafter identified, the reference numeral 1 indicates generally a building structure, which may be a house having intersecting walls which may constitute a front wall 2 and an end wall 3 of a house or other structure. A ridged roof structure is at 4 with a ridge 4A. An eave of the roof is at 5. End wall 3 has a gable area 6 extending upwardly therefrom and which is of generally triangular shape.

With attention now to the preferred embodiment of the present invention, a housing at 10 is located subjacent eave 5 and includes a foot 12 for securement to a roof structure fascia 11 in a secure manner with the fascia supported in typical fashion by roof rafter as at 9. Housing 10 defines a gutter 13 as well as an internal area 11A in which is received rolled fire retardant roof and wall blankets 15 and 16. A shaft 19 is suitably journaled as at 18 at the housing ends and carries fire retardant blankets 15–16 rolled in an interleaved manner for simultaneous extraction during deployment. Wall blanket 16 includes a sleeve 22 at its free edge within which is received a weight rod 21. Affixed to the rod at intervals are a series of snaps as at 23. Fire retardant roof blanket 15 terminates outwardly about a rod 14 to which cables as at 17 are secured in a suitable manner. It will be understood that the unseen side of roof 4 in FIG. 1 is provided with a like blanket housing and foregoing described blankets and associated components.

Indicated generally at 25 is a winch assembly including a motor 26 with output shafts equipped with drums 27. The winch assembly is offset outwardly somewhat from house end wall 3 by a platform 29. The blanket attached cables 17 are reeved through pairs of pulleys as at 33 mounted within an elongate ridge plate 32 installed in place along the roof ridge 4A at the intersection of roof portions 4. An end mounted pair of pulleys 34 support cables 17 prior to downward entrainment about winch drums 27. From the foregoing it will be seen that powered rotation of drums 27 retrieves cables 17 to extract blanket 15 from housing 10 to draw the blanket into place over roof 4. Winch assembly 25 may include clutch means to limit roof blanket travel when in place over roof 4.

During extraction of blanket 15 from housing 10, fire retardant wall blanket 16 will descend by gravity to locate weight rod 21 proximate a surface 20 to enable attachment of snaps 23 to ground embedded anchors 24. Gravity acting on the wall blanket 16 and weight rod 21 results in extension of the blanket as the combined roll of blankets is rotated by cables 17.

For retraction of blankets 16 and 15 into blanket housing 10 the housing supports a motor at 30 in driving connection with shaft 19. Motor 30 is of the type including a unidirectional clutch which overruns during blanket deployment.

For fire and thermal protection of end wall 3 of structure 1, a positionable blanket support at 34 is located subjacent an end of roof 4 and movably supported at a pivot 35 on roof fascia 11. Housing 34 may be of cylindrical shape having a lengthwise extending shaft 36 journaled therein and on which is carried an end wall fire blanket at 37 in rolled fashion. A weight bar 38 is suitably affixed to blanket 37 as by a sleeve 39 formed along the blanket extremity. End wall blanket 37 may be slit at 37A to provide segments 37B of different lengths and widths for contact with uneven ground surfaces per FIG. 1. The weight bar 38 is preferably suitably equipped with snaps of the type shown at 23 for securement of the blanket outer end to ground embedded anchors. Shaft 36 projects from the unmounted or distal end of housing 34 a sufficient distance to rest on an armature 40 of a solenoid 41 mounted in place on a rafter 9. A second or adjacent rafter 9 co-defines an area 43 viewed in FIG. 6 within which blanket support 34 is stowed in a partially concealed manner along with a folded fire retardant gable blanket 42. A plate 44 secures the upper portion of gable blanket 42 to the underside of roof 4 and may be embodied in a plate extending the length of blanket 42 while the opposite extremity of blanket 42 is attached to blanket support 34 as by a second plate 45. When deployed, gable blanket 42 is of generally triangular shape to protect gable area 6 of end wall 3. End wall fire blanket 37 is subject to extension upon support 34 reaching the horizontal position in FIG. 5 with gravity acting on weight rod 38 to locate the blanket lower extremity in ground contact. Accordingly, when deployed blanket support 34, as viewed in the broken line position of FIG. 5, along with its counterpart in place on the unseen portions of end wall 3 and gable 6 will provide a fire and heat barrier for those wall portions of structure 1.

Figures 8, 9, 10, 11, 12:
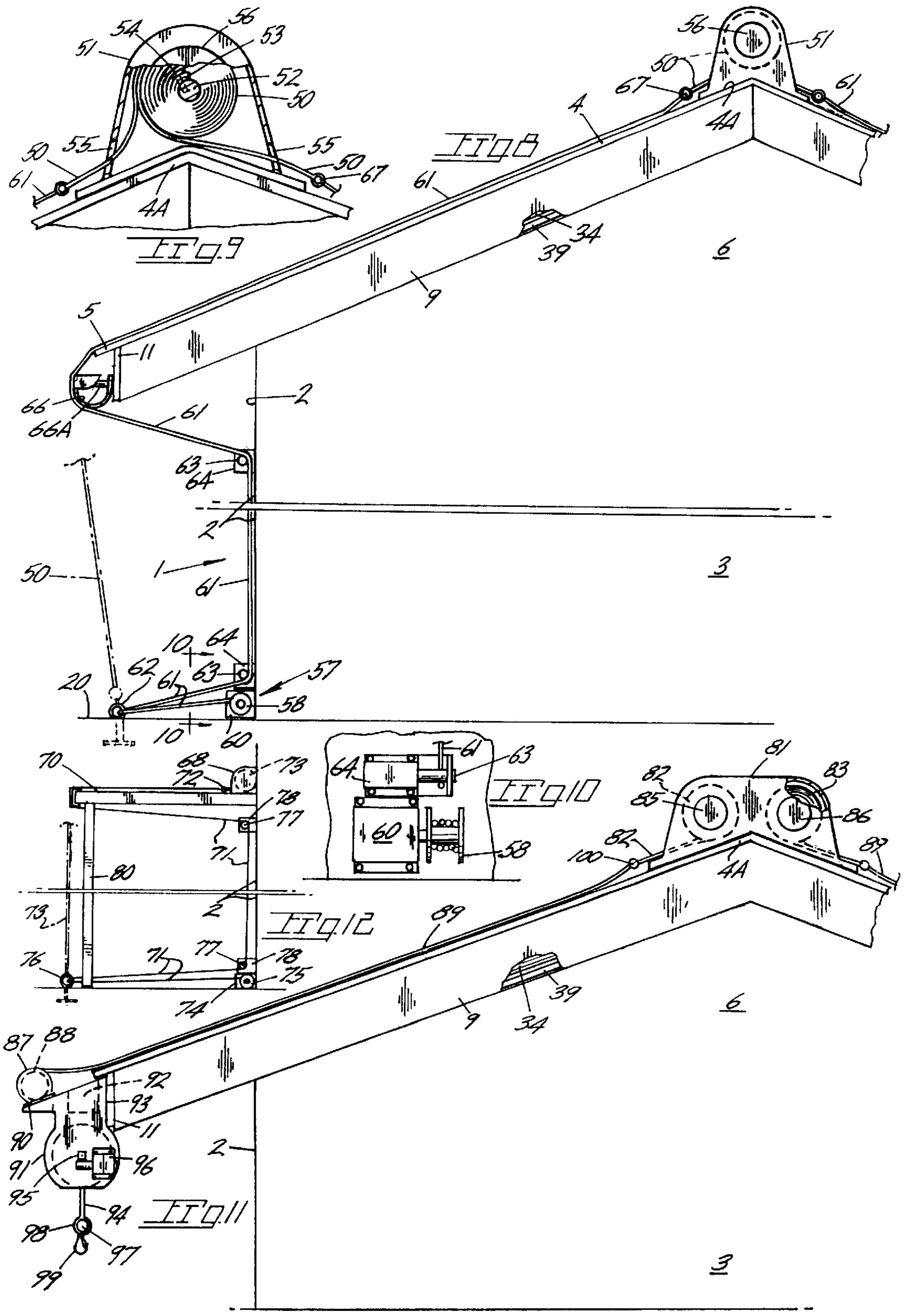
FIG. 8 is a fragmentary end elevational view of a house with a modified form of the present apparatus thereon.
FIG. 9 is an enlarged end elevational view of the blanket housing shown in FIG. 8 with fragments removed for purposes of illustration.
FIG. 10 is a vertical elevational view taken along line 10—10 of FIG. 8.
FIG. 11 is a fragmentary end elevational view of a house with still another form of the present apparatus in place thereon.
FIG. 12 is a side elevational view of a deck structure of a building structure with a fire retardant blanket housing in place on the deck.

With attention now to FIG. 8, like components of a building structure earlier described are again identified by reference numerals earlier applied. A combination roof and wall fire retardant blanket housing is indicated by reference numeral 51 located atop and along the ridge 4A of roof structure 4. As best shown in FIG. 9, roof and wall retardant blankets 50 may be a single expanse of fire retardant material folded at 53 and secured at 54 to shaft 52. Housing openings at 55 permit blanket passage. A gear head motor 56 is coupled to shaft 52 for blanket retrieval purposes.

Winch assemblies typically indicated generally at 57 are supported in place on bulding wall 2 and include a drum 58 powered by a motor 60. A cable 61 wound about drum 58 extends outwardly through a ground mounted eye 62 for reversal back toward wall 2 of the structure and upward passage about cable retainers shown as retractable guide pins 63 each actuated by a solenoid 64. The solenoids are spaced vertically along wall 2 for maintaining cable 61 in place proximate wall 2. Cable 61 and other like cables extend outwardly from uppermost guide pin 63 and upwardly about a gutter 66 reinforced at 66A for passage up roof 4 and terminating in attachment with combination roof and wall fire retardant blanket 50 at a blanket stiffener 67 affixed along the leading or outer edge of the blanket. Accordingly, motor powered means are provided to deploy blanket 50 over roof 4, downwardly past gutter 66 and to ground located eye 62. During blanket extraction, to the broken line position indicated, the solenoid actuated pins 63 are retracted to release cable 61 and allow same to move away from structure wall 2. The retention of cable 61 adjacent wall 2 when the present system is not in use avoids detracting from the appearance of the structure 1 as well as interfering with homeowner access to that area proximate front wall 2 for various purposes. The solenoid 64 and the pins or armatures 63 would be actuated simultaneously with the closure of an electrical circuit to motor 60 to commence deployment of blanket 50 by cable retrieval. Motor 60 preferably includes a clutch to terminate cable retraction upon blanket stiffener 67 contacting the ground surface 20. The end wall 3 of the building structure shown in FIG. 8 would be protected by a gable fire blanket 42 and an end wall fire blanket 37 earlier discussed and shown in FIG. 5.

As illustrated in FIG. 12, an apparatus is provided having a deck blanket housing 68 in place on an elevated deck 70 of a house, or other structure, having a front wall 2. Cables as at 71 are attached at 72 to the leading outer edge of a fire retardant blanket 73 within housing 68. A winch motor 74 powers a cable drum 75 to retract cable 71 through a ground embedded eye 76 and thence past guide pins 77 shown as armatures of solenoids 78 and ultimately toward attachment at 72 with the leading edge of blanket 73. As described in the foregoing modified form of the invention, the pins 77 are retracted upon activation of a circuit including motor 74 to permit cable 71 to move laterally for retrieval directly through eye 76 ultimately deploying blanket 73 to the broken line position shown. Accordingly, the deck 70 and supports 80 therefore would be protected from heat and/or fire.

With attention now to FIG. 11, structural components, earlier described, of a building are again indentified with earlier applied reference numerals. A roof blanket housing is indicated at 81 in place along a roof ridge 4A and within which is stowed fire retardant roof blankets 82 and 83 each carried by a separate shaft journaled in the housing. Gear head motors at 85 and 86 each power one of said shafts for blanket retrieval from a deployed operational position.

Motor powered means comprises a gear head motor at 87 which powers a cable drum 88 upon closure of a circuit to motor 87. Depending on roof size and blanket 82,motor 87 may drive multiple drums 88 spaced along a motor output shaft. A motor base 90 is secured in place on wall blanket housing 91 which also serves to provide a roof gutter 92. Energizing of motor 87 by automatic or manual electrical controls permits retraction of a cable or cables 89 and roof blanket 82 to which the cables are attached at a stiffener 100 extending along the blanket leading edge. Blanket housing 91 has a planar surface at 93 facilitating housing securement to a fascia 11 as by threaded fasteners not shown. A fire retardant wall blanket 94 is stowed within housing 91 about a shaft 95 extending length-wise thereof and suitably journaled therein. Shaft 95 is confined against rotation by a solenoid 96 having its armature in abutment with a squared end segment of the shaft. A weight rod 97, carried by a blanket sleeve 98, serves to extend the blanket by gravity to permit securement of snaps 99 to ground installed anchors of the type above described.

Figure 13:
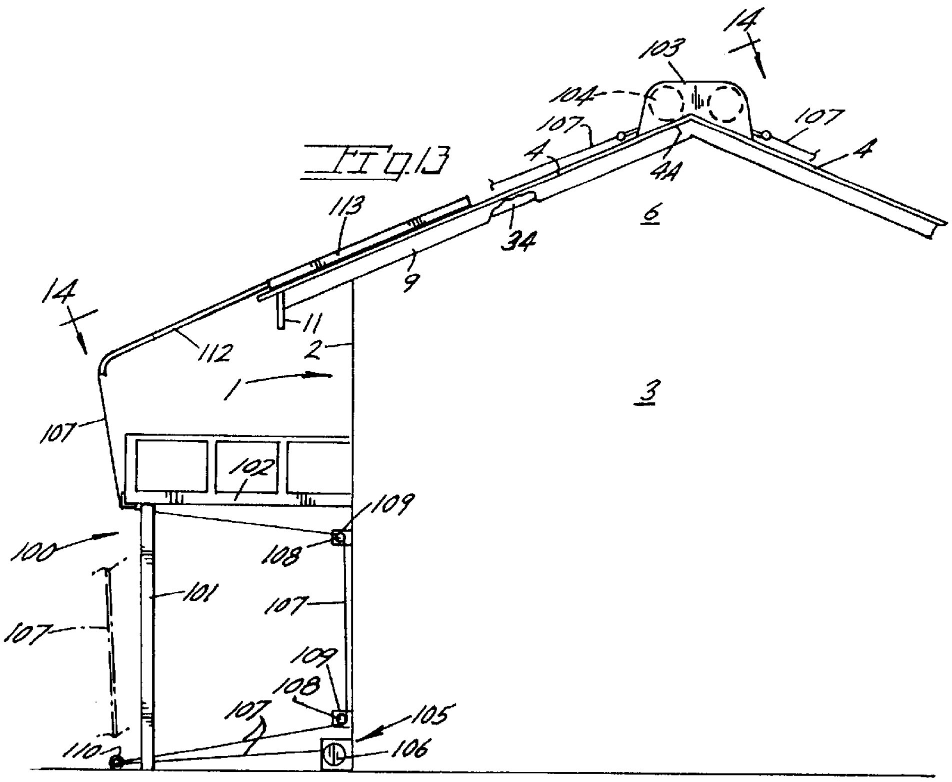
FIG. 13 is an end elevational view of a house with still another modified form of the present apparatus additionally protecting a deck structure.
Figure 14:
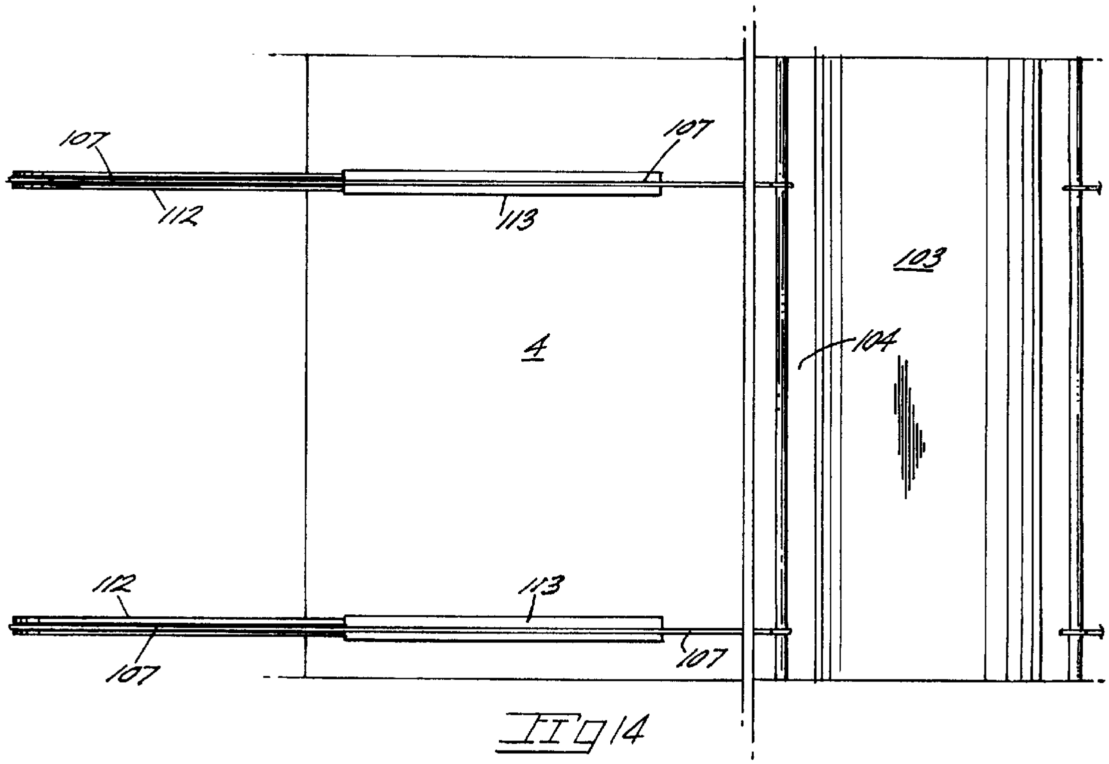
FIG. 14 is d view taken downwardly along line 14—14 of FIG. 13.

In FIGS. 13 and 14, a still further modified form of the present fire protection apparatus is shown particularly suited for use in association with a building structure 1 shown as a house having a wall 2, an end wall 3 terminating upwardly in a gable 6 and a roof 4. Associated with wall 2 is a deck structure indicated generally at 100 with series of posts 101 supporting elevated decking at 102.

The modified fire apparatus utilizes a roof mounted blanket housing 103 within which is stowed a fire retardant blanket 104 carried by a shaft journalled in the housing.

Motor powered means includes a winch assembly generally at 105 including a drum 106 which receives a cable at 107. Cable retainers are shown as guide pins 108 which are armatures of solenoids 109 which permit, as earlier noted in another form of the invention, cable 107 to be released from the path shown in FIG. 13 proximate wall 2 to a course outwardly from deck structure 100 to facilitate drawing of blanket 104 downwardly and outwardly past deck structure 101 to ground inserted eye 110 which at all times receives a run of cable 107.

Combination cable guides and blanket supports indicated at 112 are affixed to roof 4 of the building structure and extend outwardly therefrom to each support a run of cable 107 above and outwardly from the deck structure. The combination cable guides and blanket supports 112 are carried within roof mounted tubular members 113 with the cables 107 entrained lengthwise along the supports.

Upon operation of winch assembly 105 and solenoids 109 the guide pins 108 are retracted to permit the cable to relocate outwardly from deck structure 100 per the broken line position. Blanket 104 is extracted from housing 103 by the cables and drawn outwardly and downwardly over roof 4 and thence downwardly past deck 100 to locate the blanket outer edge proximate ground inserted eyes 100.

The fabric for the fire retardant blankets may be that type used for garments worn by persons that may be subject to high temperature environments as for example fire fighters, astronaughts, race car drivers, etc.

A control center in the protected building structure would preferably include manually actuated switches in circuit with the various electrical components of the apparatus. Automatic deployment of the fire retardant blankets could also be initiated by temperature responsive sensors or coded radio transmissions as well as still other control systems believed to be within the purview of those knowledgeable of electrical controls.

While we have shown and descibed but a few embodiments of the invention, it will be apparent to those skilled in the art that the invention may be embodied still otherwise without departing from the spirit and scope of the invention.

Having thus described the invention, what is desired to be secured by a Letters Patent is:

We claim:

1. Fire protection apparatus for installation on a building having contiguous exterior walls including end walls and a roof structure, said apparatus comprising, a blanket housing affixable to said roof structure and including a fire retardant roof blanket stored therein for deployment on the roof structure and a fire retardant wall blanket for gravitational deployment adjacent a wall of the structure motor powered means including a cable coupled to said roof blanket for drawing the roof blanket into a location overylying a portion of the roof, a blanket support for installation adjacent an end wall of the building structure and having a stowed elevated position and an operational lowered position and pivot means movably affixable to the structure, said blanket support including a fire retardant wall blanket for deployment by gravity a gable blanket attached to said blanket support and attachable to the building structure and deployed upon movement of said blanket support to said operational position adjacent a wall of the structure, and retention means attachable to the building structure and normally engaged with and confining said blanket support in said stowed elevated position and operable to permit gravitation of the support to said operational position.

2. The apparatus claimed in claim 1 wherein said blanket housing includes a gutter and a base for attachment to the roof structure.

3. The apparatus claimed in claim 2 wherein said fire retardant wall blanket includes a weight member to facilitate deployment.

4. The apparatus claimed in claim 3 wherein said blanket housing includes a shaft, said fire retardant roof blanket and said fire retardant wall blanket wound in an interleaved manner on said shaft.

5. The apparatus claimed in claim 1 wherein said fire retardant wall blanket includes blanket segments of different lengths.

6. The apparatus claimed in claim 1 additionally including a roof ridge plate, said cable entrained along said plate, said motor powered means for installation on the building structure and including a winch assembly receiving said cable.

7. A fire protection apparatus for a building structure having contiguous exterior walls and a roof structure, said apparatus comprising, a blanket housing for installation on said roof structure, a combination roof and wall fire retardant blanket stored in said housing for deployment over the building structure, motor powered means including a cable coupled to said roof and wall fire retardant blanket to deploy the blanket into a location overlying a portion of the roof structure and of a first wall of the building structure, a blanket support for pivoted attachment to the building structure and having a stowed elevated position and an operational lowered position and including a fire retardant end wall blanket for gravity deployment into position adjacent a second wall of the building structure, a gable blanket attached to said blanket support and deployed upon movement of the blanket support to the operational lowered position, and retention means normally engaged with and confining said blanket support in said stowed elevated position and operable to permit gravitation of the support to said operational position.

8. The apparatus claimed in claim 7 wherein said motor powered means includes a winch assembly with drum for retreiving said cable, a cable retainer for confining said cable proximate the structure, said cable retainer including a solenoid actuated member disengageable from the cable.

9. The apparatus claimed in claim 7 wherein said fire retardant end wall blanket is segmented into blanket segments of different lengths.

10. The fire protection apparatus claimed in claim 7 wherein said blanket housing includes a shaft, said roof and wall fire retardant blanket including multiple members wound in a concentric manner on said shaft.

11. Fire protection apparatus for a building structure having contiguous exterior walls and a roof structure, said appratus comprising, a blanket housing for installation on the roof structure and including a fire retardant roof blanket stored therein, motor powered means for installation on said roof structure and including cables coupled to said roof blanket to deploy the blanket into a location overlying a portion of the roof structure, a blanket support for pivotal attachment to the building structure and having a stowed elevated position and an operational lowered position and including a fire retardant blanket for gravity deployment into position adjacent an exterior wall of the building structure, a gable blanket for attachment to said roof structure and said blanket support and deployed upon movement of said blanket support to said operational lowered position adjacent said exterior wall of the building structure, retention means for installation on said roof structure and normally engaged with and confining said blanket support in said stowed elevated position and operable to permit gravitation of the support to said operational position, and a wall blanket housing attachable to said roof structure and defining a gutter, a shaft journaled in said wall blanket housing, a fire retardant wall blanket carried on said shaft for deployment along a wall of the building structure, control means engaged with said shaft and alternatively disengageable therefrom to allow gravitational deployment of said fire retardant wall blanket from said housing, said fire retardant wall blanket including a weighted member facilitating deployment by gravity of the wall blanket.

12. The apparatus claimed in claim 11 wherein said fire retardant blanket of said blanket support is segmented into blanket segments of different lengths.

13. The apparatus claimed in claim 11 wherein said motor powered means includes a motor in place on said wall blanket housing.

14. Fire protection apparatus for a building structure having contiguous exterior walls and a deck partially supported by one of said walls, said apparatus comprising, a blanket housing for placement on the deck of said building structure and including a fire retardant deck blanket stored in the housing for deployment over the deck, and motor powered means including cables coupled to said deck blanket to deploy the blanket, cable retainers for installation on said building structure and including solenoid actuated guides past which said cables are entrained and permitting upon solenoid actuation the course of said cables to be altered during blanket deployment.

15. Fire protection apparatus for a building structure having contiguous exterior walls and a deck supported by one of said walls and a roof structure, said apparatus comprising, a blanket housing for installation on said roof structure and including a fire retardant blanket stored therein for deployment both over said roof structure and said deck, motor powered means including cables coupled to said fire retardant blanket to draw the blanket from said housing, cable retainers for placement on said building structure and including solenoid actuated guides past which said cables are entrained and upon actuation permitting the course of said cables to be altered during blanket deployment, combination cable guides and blanket supports for installation on said roof structure and projecting outwardly therefrom for supporting a run of each of said cables, said combination cable guides and blanket supports facilitating downward passage of said cables and blanket past said deck during blanket deployment.

* * * * *